(12) United States Patent
Chen et al.

(10) Patent No.: US 12,349,079 B2
(45) Date of Patent: Jul. 1, 2025

(54) POWER MODE DISTINCTION

(71) Applicant: QUALCOMM Incorporated, San Diego, CA (US)

(72) Inventors: Siyi Chen, Beijing (CN); Changlong Xu, Beijing (CN); Jing Sun, San Diego, CA (US); Xiaoxia Zhang, San Diego, CA (US); Hao Xu, Beijing (CN); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 18/000,252

(22) PCT Filed: Jul. 17, 2020

(86) PCT No.: PCT/CN2020/102639
§ 371 (c)(1),
(2) Date: Nov. 29, 2022

(87) PCT Pub. No.: WO2022/011672
PCT Pub. Date: Jan. 20, 2022

(65) Prior Publication Data
US 2023/0199668 A1 Jun. 22, 2023

(51) Int. Cl.
*H04W 52/18* (2009.01)
*H04W 52/14* (2009.01)

(52) U.S. Cl.
CPC ......... *H04W 52/18* (2013.01); *H04W 52/146* (2013.01)

(58) Field of Classification Search
CPC ... H04W 52/18; H04W 52/14; H04W 52/146; H04L 1/0026; H04L 1/0029
See application file for complete search history.

(56) References Cited

U.S. PATENT DOCUMENTS

| 11,515,917 B2 * | 11/2022 | Sergeev | H04B 7/0663 |
| 11,595,893 B2 * | 2/2023 | Sarkis | H04W 72/23 |
| 11,785,594 B2 * | 10/2023 | Khoshnevisan | H04L 5/0094 370/329 |
| 11,800,568 B2 * | 10/2023 | Kim | H04W 48/10 |

(Continued)

FOREIGN PATENT DOCUMENTS

| CN | 110536394 A | 12/2019 | |
| WO | WO-2020062896 A1 | 4/2020 | |
| WO | WO-2021152728 A1 * | 8/2021 | H04L 5/0037 |

OTHER PUBLICATIONS

International Search Report and Written Opinion—PCT/CN2020/102639—ISA/EPO—Apr. 16, 2021.

(Continued)

*Primary Examiner* — Hai V Nguyen
(74) *Attorney, Agent, or Firm* — Harrity & Harrity, L.L.P \ Qualcomm

(57) ABSTRACT

Various aspects of the present disclosure generally relate to wireless communication. In some aspects, a user equipment may determine a power mode of a base station based at least in part on a control resource set (e.g., CORESET0) configuration index received in a master information block from the base station and transmit communications to the base station with a transmit power that is based at least in part on the power mode of the base station. Numerous other aspects are provided.

25 Claims, 14 Drawing Sheets

700 ⟶

730
Determine control resource set zero (CORESET0) configuration index for UE based at least in part on power mode of base station 740
Determine power mode of base station based at least in part on CORESET0 configuration index received in MIB 735
Transmit CORESET0 configuration index in master information block (MIB)

745
Transmit communications with transmit power that is based at least in part on power mode of base station

BS 710

UE 720

(56) References Cited

U.S. PATENT DOCUMENTS

| | | | |
|---|---|---|---|
| 11,963,040 B2* | 4/2024 | Wei | H04L 5/0094 |
| 12,010,540 B2* | 6/2024 | Xiong | H04L 1/08 |
| 12,075,361 B2* | 8/2024 | Yao | H04W 72/046 |
| 12,089,139 B2* | 9/2024 | Lei | H04W 48/14 |
| 12,207,228 B2* | 1/2025 | Kim | H04W 76/28 |
| 12,245,173 B2* | 3/2025 | Abedini | H04L 5/0048 |
| 2019/0150088 A1 | 5/2019 | Sun et al. | |
| 2019/0254030 A1* | 8/2019 | Wu | H04W 48/12 |
| 2019/0289552 A1* | 9/2019 | Jain | H04B 7/0626 |
| 2020/0314749 A1* | 10/2020 | Sarkis | H04L 5/0092 |
| 2020/0351682 A1* | 11/2020 | Cirik | H04W 76/28 |
| 2021/0111818 A1* | 4/2021 | Zhu | H04L 5/0048 |
| 2022/0038935 A1* | 2/2022 | Xiong | H04W 72/542 |
| 2022/0077911 A1* | 3/2022 | Sergeev | H04B 7/0658 |
| 2022/0116821 A1* | 4/2022 | Wei | H04B 7/15542 |
| 2022/0353893 A1* | 11/2022 | Choi | H04L 5/0053 |
| 2022/0377810 A1* | 11/2022 | Bhamri | H04B 7/06966 |
| 2023/0072886 A1* | 3/2023 | Kim | H04W 68/005 |
| 2023/0073665 A1* | 3/2023 | Kim | H04W 48/10 |
| 2023/0124679 A1* | 4/2023 | Kim | H04W 76/28 370/329 |
| 2023/0254854 A1* | 8/2023 | Cirik | H04L 1/1887 370/336 |
| 2024/0040592 A1* | 2/2024 | Abedini | H04L 1/0009 |
| 2024/0214109 A1* | 6/2024 | Zhang | H04L 1/0016 |
| 2024/0224270 A1* | 7/2024 | Xiong | H04B 7/0626 |
| 2024/0244595 A1* | 7/2024 | Wang | H04L 5/0094 |
| 2024/0298202 A1* | 9/2024 | Park | H04W 24/10 |
| 2025/0113334 A1* | 4/2025 | Kim | H04W 68/005 |

OTHER PUBLICATIONS

Sony: "On PDCCH-Based Power Saving Channel", R1-1910751, 3GPP TSG RAN WG1 #98bis, Chongqing, PR China, Oct. 14-18, 2019, Oct. 18, 2019 (Oct. 18, 2019) the Whole Document, 9 Pages.

* cited by examiner

| Index | SS/PBCH block and CORESET multiplexing pattern | Number of RBs $N^{CORESET}_{RB}$ | Number of Symbols $N^{CORESET}_{symb}$ | Offset (RBs) |
|---|---|---|---|---|
| 0 | 1 | 48 | 1 | 0 |
| 1 | 1 | 48 | 1 | 1 |
| 2 | 1 | 48 | 1 | 2 |
| 3 | 1 | 48 | 1 | 3 |
| 4 | 1 | 48 | 2 | 0 |
| 5 | 1 | 48 | 2 | 1 |
| 6 | 1 | 48 | 2 | 2 |
| 7 | 1 | 48 | 2 | 3 |
| 8 | 1 | 48*4 | 1 | 0 |
| 9 | 1 | 48*4 | 1 | 1 |
| 10 | 1 | 48*4 | 1 | 2 |
| 11 | 1 | 48*4 | 1 | 3 |
| 12 | 1 | 48*4 | 2 | 0 |
| 13 | 1 | 48*4 | 2 | 1 |
| 14 | 1 | 48*4 | 2 | 2 |
| 15 | 1 | 48*4 | 2 | 3 |

| Index | SS/PBCH block and CORESET multiplexing pattern | Number of RBs $N^{CORESET}_{RB}$ | Number of Symbols $N^{CORESET}_{symb}$ | Offset (RBs) |
|---|---|---|---|---|
| 0 | 1 | 96 | 1 | 10 |
| 1 | 1 | 96 | 1 | 12 |
| 2 | 1 | 96 | 1 | 14 |
| 3 | 1 | 96 | 1 | 16 |
| 4 | 1 | 96 | 2 | 10 |
| 5 | 1 | 96 | 2 | 12 |
| 6 | 1 | 96 | 2 | 14 |
| 7 | 1 | 96 | 2 | 16 |
| 8 | 1 | 96*2 | 1 | 10 |
| 9 | 1 | 96*2 | 1 | 12 |
| 10 | 1 | 96*2 | 1 | 14 |
| 11 | 1 | 96*2 | 1 | 16 |
| 12 | 1 | 96*2 | 2 | 10 |
| 13 | 1 | 96*2 | 2 | 12 |
| 14 | 1 | 96*2 | 2 | 14 |
| 15 | 1 | 96*2 | 2 | 16 |

FIG. 6

POWER MODE DISTINCTION

CROSS-REFERENCE TO RELATED APPLICATION

This Patent Application is a 371 national stage of PCT Application No. PCT/CN2020/102639 filed on Jul. 17, 2020, entitled "POWER MODE DISTINCTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for distinguishing power modes of a base station.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a power mode of a base station based at least in part on a control resource set (CORESET) configuration index (e.g., CORESET0 configuration index) received in a master information block from the base station and transmitting communications to the base station with a transmit power that is based at least in part on the power mode of the base station.

In some aspects, a method of wireless communication performed by a base station includes determining a CORESET configuration index for a UE based at least in part on a power mode of the base station and transmitting the CORESET configuration index to the UE in a master information block.

In some aspects, a method of wireless communication performed by a UE includes determining a power mode of a base station based at least in part on a frequency position of a synchronization signal block (SSB) and transmitting communications with a transmit power that is based at least in part on the power mode of the base station.

In some aspects, a method of wireless communication performed by a base station includes determining a frequency position of an SSB for a UE based at least in part on a power mode of the base station and transmitting an SSB to the UE at the frequency position of the SSB.

In some aspects, a UE for wireless communication includes a memory and one or more processors operatively coupled to the memory, the memory and the one or more processors configured to determine a power mode of a base station based at least in part on a CORESET configuration index received in a master information block from the base station and transmit communications to the base station with a transmit power that is based at least in part on the power mode of the base station.

In some aspects, a base station for wireless communication includes a memory and one or more processors operatively coupled to the memory, the memory and the one or more processors configured to determine a CORESET configuration index for a UE based at least in part on a power mode of the base station and transmit the CORESET configuration index to the UE in a master information block.

In some aspects, a UE for wireless communication includes a memory and one or more processors operatively coupled to the memory, the memory and the one or more processors configured to determine a power mode of a base station based at least in part on a frequency position of an SSB and transmit communications with a transmit power that is based at least in part on the power mode of the base station.

In some aspects, a base station for wireless communication includes a memory and one or more processors operatively coupled to the memory, the memory and the one or more processors configured to determine a frequency position of an SSB for a UE based at least in part on a power mode of the base station and transmit an SSB to the UE at the frequency position of the SSB.

In some aspects, a non-transitory computer-readable medium storing a set of instructions for wireless communication includes one or more instructions that, when executed by one or more processors of a UE, cause the UE to determine a power mode of a base station based at least in part on a CORESET configuration index received in a master information block from the base station and transmit communications to the base station with a transmit power that is based at least in part on the power mode of the base station.

In some aspects, a non-transitory computer-readable medium storing a set of instructions for wireless communication includes one or more instructions that, when executed by one or more processors of a base station, cause the base station to determine a CORESET configuration index for a UE based at least in part on a power mode of the base station and transmit the CORESET configuration index to the UE in a master information block.

In some aspects, a non-transitory computer-readable medium storing a set of instructions for wireless communication includes one or more instructions that, when executed by one or more processors of a UE, cause the UE to determine a power mode of a base station based at least in part on a frequency position of an SSB and transmit communications with a transmit power that is based at least in part on the power mode of the base station.

In some aspects, a non-transitory computer-readable medium storing a set of instructions for wireless communication includes one or more instructions that, when executed by one or more processors of a base station, cause the base station to determine a frequency position of an SSB for a UE based at least in part on a power mode of the base station and transmit an SSB to the UE at the frequency position of the SSB.

In some aspects, an apparatus for wireless communication includes means for determining a power mode of a base station based at least in part on a CORESET configuration index received in a master information block from the base station and means for transmitting communications to the base station with a transmit power that is based at least in part on the power mode of the base station.

In some aspects, an apparatus for wireless communication includes means for determining a CORESET configuration index for a UE based at least in part on a power mode of the apparatus and means for transmitting the CORESET configuration index to the UE in a master information block.

In some aspects, an apparatus for wireless communication includes means for determining a power mode of a base station based at least in part on a frequency position of an SSB and means for transmitting communications with a transmit power that is based at least in part on the power mode of the base station.

In some aspects, an apparatus for wireless communication includes: means for determining a frequency position of an SSB for a UE based at least in part on a power mode of the apparatus and means for transmitting an SSB to the UE at the frequency position of the SSB.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a table illustrating an example of control resource set (CORESET) configuration indices that may be used to distinguish power modes of a base station, in accordance with various aspects of the present disclosure.

FIG. 6 is a table illustrating an example of CORESET configuration indices that may be used to distinguish power modes of a base station, in accordance with various aspects of the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
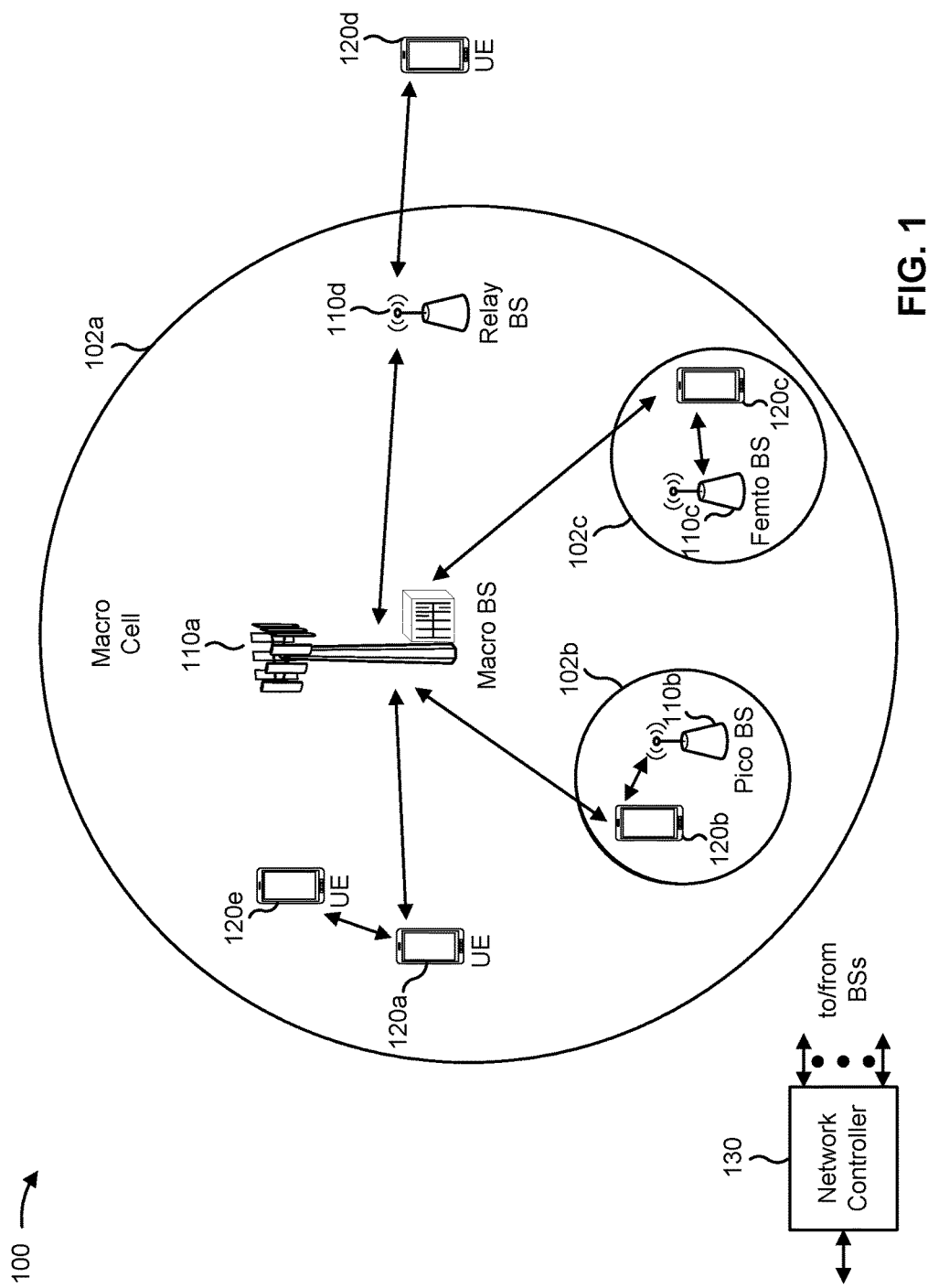
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
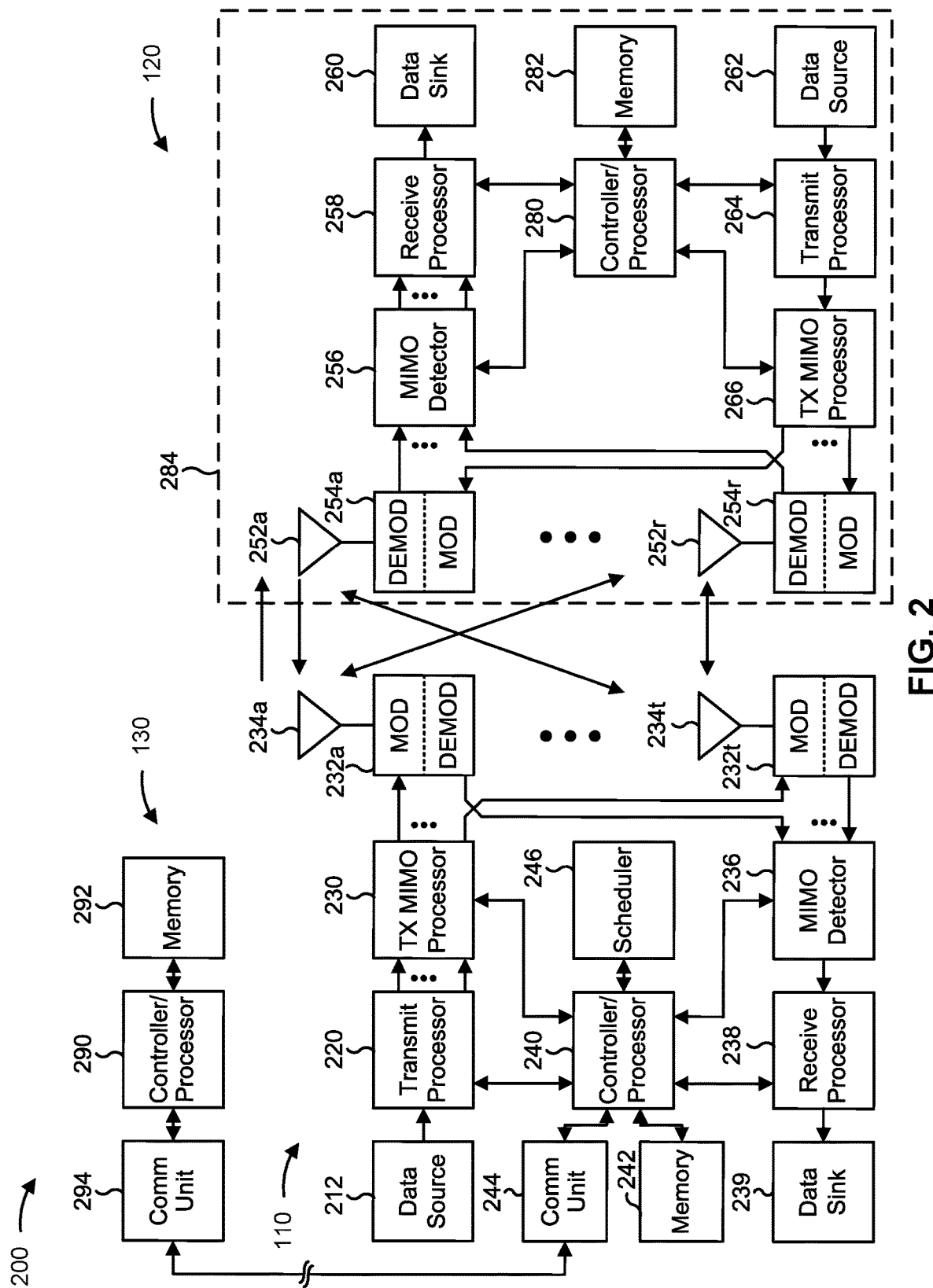
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-14.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-14.

Controller/processor 240 of base station 110, controller/processor 280 of UE 120, and/or any other component(s) of FIG. 2 may perform one or more techniques associated with distinguishing power modes of a base station, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, process 1400 of FIG. 14, and/or other processes as described herein. In some aspects, executing instructions may include running the instructions, converting the instructions, compiling the instructions, interpreting the instructions, and/or the like.

In some aspects, UE 120 may include means for determining a power mode of a base station based at least in part on a CORESET configuration index received in a master information block (MIB) from the base station, means for transmitting communications to the base station with a transmit power that is based at least in part on the power mode of the base station, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining a power mode of a base station based at least in part on a frequency position of a synchronization signal block (SSB), means for transmitting communications with a transmit power that is based at least in part on the power mode of the base station, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a CORESET configuration index for a UE based at least in part on a power mode of the base station, means for transmitting the CORESET configuration index to the UE in an MIB, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for determining a frequency position of an SSB for a UE based at least in part on a power mode of the base station, means for transmitting an SSB to the UE at the frequency position of the SSB, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
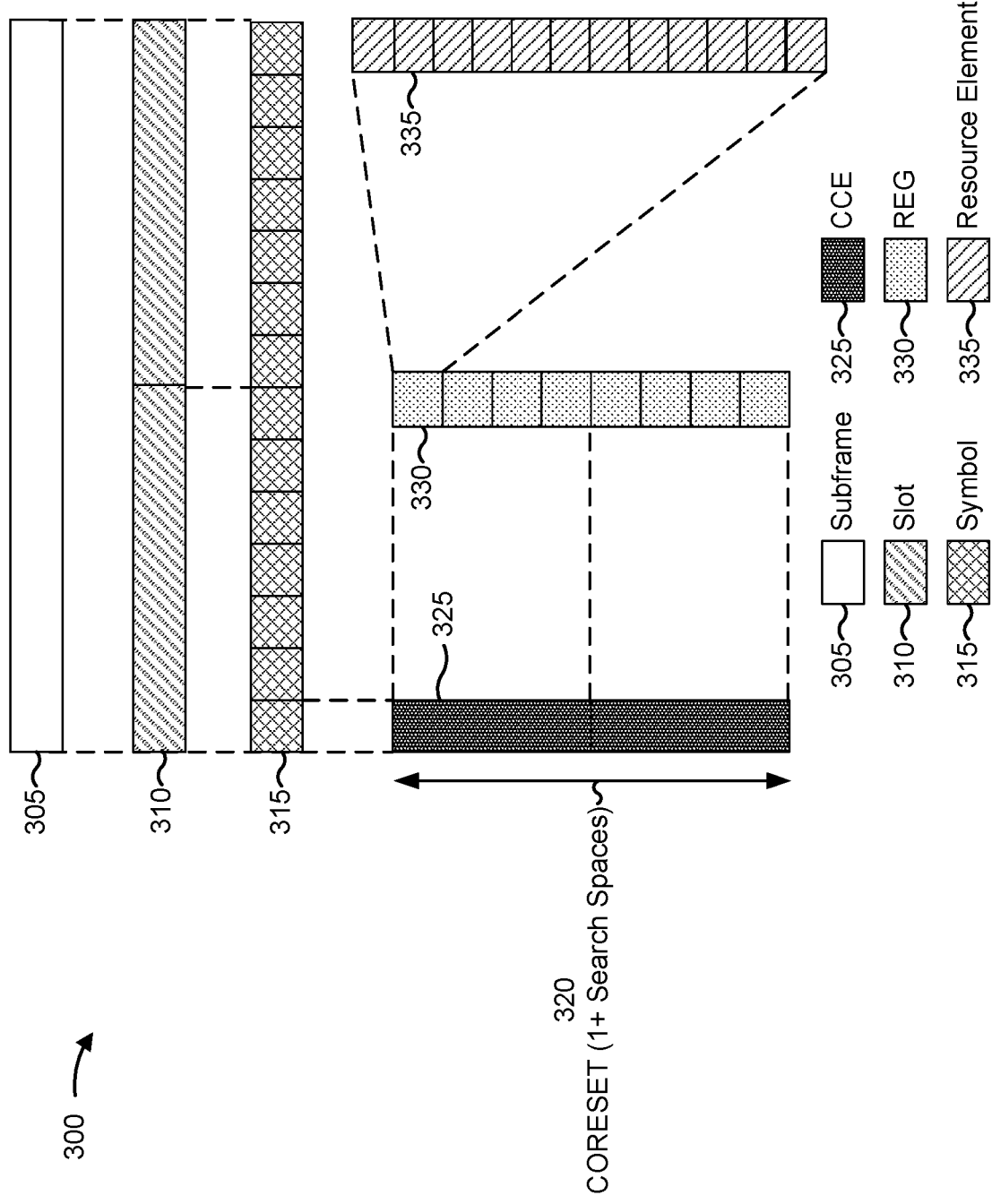
FIG. 3 is a diagram illustrating an example resource structure for wireless communication, in accordance with various aspects of the present disclosure.

FIG. 3 is a diagram illustrating an example resource structure 300 for wireless communication, in accordance with various aspects of the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 310 may include multiple symbols 315, such as 7 symbols or 14 symbols per slot.

The potential control region of a slot 310 may be referred to as a CORESET 320 and may be structured to support an efficient use of resources, such as by flexible configuration or reconfiguration of resources of the CORESET 320 for one or more PDCCHs, one or more physical downlink shared channels (PDSCHs), and/or the like. In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 4, 8, 16, and/or the like.

Each CCE 325 may include a fixed quantity of resource element groups (REGs) 330, shown as 4 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a physical downlink control channel (PDCCH) may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

Figure 4:
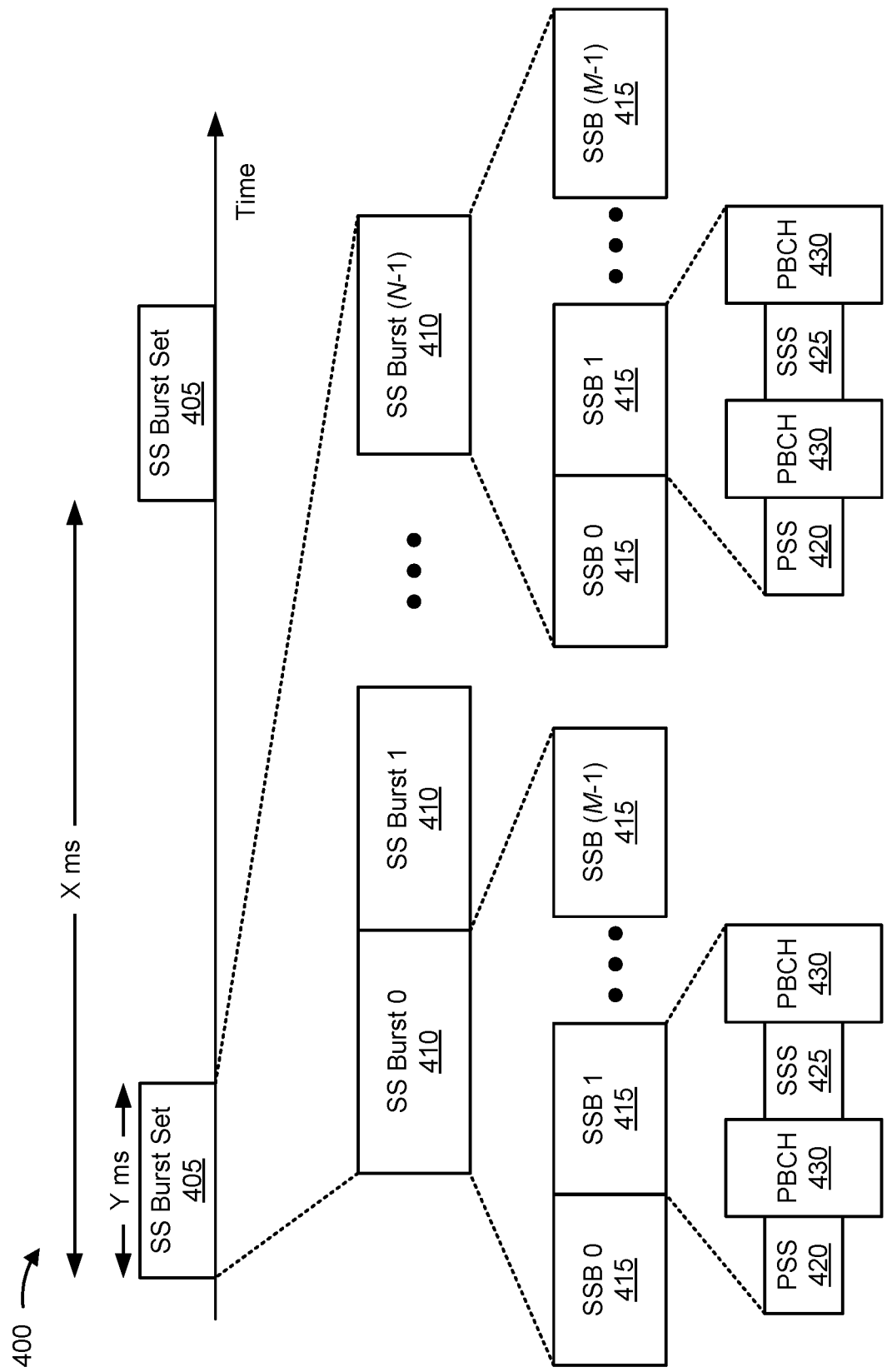
FIG. 4 is a diagram illustrating an example of a synchronization signal hierarchy, in accordance with various aspects of the present disclosure.

FIG. 4 is a diagram illustrating an example 400 of a synchronization signal (SS) hierarchy, in accordance with various aspects of the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for beam management, beam selection, and/or the like (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window, an SSB measurement time configuration (SMTC) window, and/or the like.

In some aspects, an SSB 415 may include resources that carry a primary synchronization signal (PSS) 420, a secondary synchronization signal (SSS) 425, a physical broadcast channel (PBCH) 430, and/or the like. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415.

A UE 120 may monitor for and/or measure SSBs 415 using different receive (Rx) beams during an initial network access procedure. Based at least in part on the monitoring and/or measuring, the UE 120 may indicate one or more SSBs 415 with a best signal parameter (e.g., a reference signal received power (RSRP) parameter and/or the like) to a base station 110. The base station 110 and the UE 120 may use the one or more indicated SSBs 415 to select one or more beams to be used for communication between the base station 110 and the UE 120 (e.g., for a random access channel (RACH) procedure and/or the like). Additionally, or alternatively, the UE 120 may use the SSB 415 and/or the SSB index to determine a cell timing for a cell via which the SSB 415 is received (e.g., a serving cell).

A synchronization raster may indicate frequency positions of an SSB used for initial acquisition when explicit signaling of the SSB position is not present. A sparser synchronization raster may reduce NR cell acquisition time compared with a denser channel raster. A frequency position of an SSB may be defined for FR1, and a synchronization raster may map to PRB number 10 and RE 0 of the SSB.

As indicated above, FIG. 4 is provided as an example. Other examples may differ from what is described with regard to FIG. 4.

In the 6 GHz band, there may be different device classes with various power limitations. For example, an access point (e.g., gNB) in standard power mode may have a maximum effective isotropic radiated power (EIRP) of 36 decibel-milliwatts (dBm) and a maximum power spectrum density (PSD) of 23 dBm/MHz. Note that a client (e.g., UE) may have a transmit power that is 6 dBm less than the gNB. For example, a UE may operate under the control of a standard power gNB, and the standard power gNB may have a maximum EIRP of 30 dBm and a maximum PSD of 17 dBm/MHz. The gNB may be in contact with an automated frequency coordination (AFC) entity to know, for each frequency, what is the maximum PSD and maximum EIRP.

A gNB in a low power mode (also referred to as a low power indoor (LPI) mode), may have a maximum EIRP of 30 dBm and a maximum PSD of 5 dBm/MHz, but a UE connected to the low power gNB may have a maximum EIRP of 24 dBm and a maximum PSD of −1 dBm/MHz. The gNB may use a low power mode without contact with the AFC entity. Both the gNB and associated UEs may employ a contention-based protocol.

A device in a very low power mode may have a maximum EIRP of between 4 dBm and 14 dBm and a maximum PSD of −18 dBm/MHz to −8 dBm/MHz. The device may operate indoors or outdoors and may operate across an entirety of the 6 GHz band without using the AFC entity.

A client (e.g., UE) may operate with a transmit power that is 6 dBm less than a transmit power of an access point (e.g., gNB). This helps the UE and the gNB to stay within a maximum EIRP and/or a maximum PSD. However, the gNB may operate in either a standard power mode or a low power mode. If the gNB operates in a low power mode and the UE does not know that the gNB is operating in the low power mode, the transmit power of the UE may be too high and may cause interference for communications by the gNB. As a result, communications may degrade, and the UE may waste transmit power.

According to various aspects of the present disclosure, a client (e.g., UE) may be able to determine a power mode of an access point (e.g., gNB) so as to distinguish between a standard power mode and a low power mode. The UE may determine the power mode of the gNB via control information, such as a CORESET index (e.g., CORESET0 configuration index). For example, the gNB may indicate a power mode of the gNB via a particular range of CORESET0 configuration indices. One range of CORESET0 configuration indices may indicate that the gNB is in a standard power mode. Another range of CORESET0 configuration indices may indicate that the gNB is in a low power mode. Accordingly, the UE may reduce a transmit power of the UE if the gNB is in a low power mode.

Alternatively, or additionally, the gNB may indicate a power mode of the gNB via a frequency position of an SSB. Certain frequency positions for an SSB may indicate a standard power mode, and certain frequency positions that are offset may indicate a low power mode. The UE may reduce a transmit power of the UE if necessary. As a result, the UE avoids degraded communications caused by overpowering a gNB signal, and the UE saves power.

FIG. 5 is a table illustrating an example 500 of CORESET0 configuration indices that may be used to distinguish power modes of a base station, in accordance with various aspects of the present disclosure. CORESET0 may be a Type-0 PDCCH CORESET configuration, and example 500 may be for a subcarrier spacing (SCS) of 30 KHz. Example 500 may represent information found in system information, such as in a pdcch-ConfigSIB1 information element in an MIB. Example 500 shows columns that include an index, an SS/PBCH block and a CORESET multiplexing pattern, a number of resource blocks (RBs), a number of symbols, and an RB offset.

Example 500 shows that for indices 0-7, a number of RBs is 48. For indices 8-15, a number of RBs is 48 times 4. In some aspects, the number of RBs may be indicative of a power mode. That is, indices 0-7 may indicate a standard power mode for a base station. Indices 8-15 may indicate a low power mode for the base station. The base station may select a CORESET0 index based at least in part on a power mode of the base station. Correspondingly, the UE may determine the power mode of the base station from the CORESET0 index it receives in an MIB. The UE may determine the power mode of the base station without additional signaling or information elements, and the UE and the base station may save signaling resources.

In some aspects, the UE may determine that a CORESET0 configuration index corresponds to a bandwidth part (BWP) size. A CORESET0 bandwidth may be equal to an initial BWP, and the UE may need to determine the initial BWP before receiving a first system information block (SIB1). For a standard power mode, the initial BWP may be 20 MHz. For a low power mode, the initial BWP may be 80 MHz.

As indicated above, FIG. 5 is provided as an example. Other examples may differ from what is described with regard to FIG. 5.

FIG. 6 is a table illustrating an example 600 of CORESET0 configuration indices that may be used to distinguish power modes of a base station, in accordance with various aspects of the present disclosure. Example 600 may include the same columns as the table in example 500 shown in FIG. 5.

Example 600 is for an SCS of 15 KHz. Example 600 shows that for indices 0-7, the number of RBs is 96. Indices 0-7 may indicate a standard power mode for a base station. Example 600 shows that for indices 8-15, the number of RBs is 96 times 2. Indices 8-15 may indicate a low power mode for the base station. The base station may select a CORESET0 index based at least in part on a power mode of the base station. The UE may determine the power mode of the base station from the CORESET0 index.

As indicated above, FIG. 6 is provided as an example. Other examples may differ from what is described with regard to FIG. 6.

Figure 7:
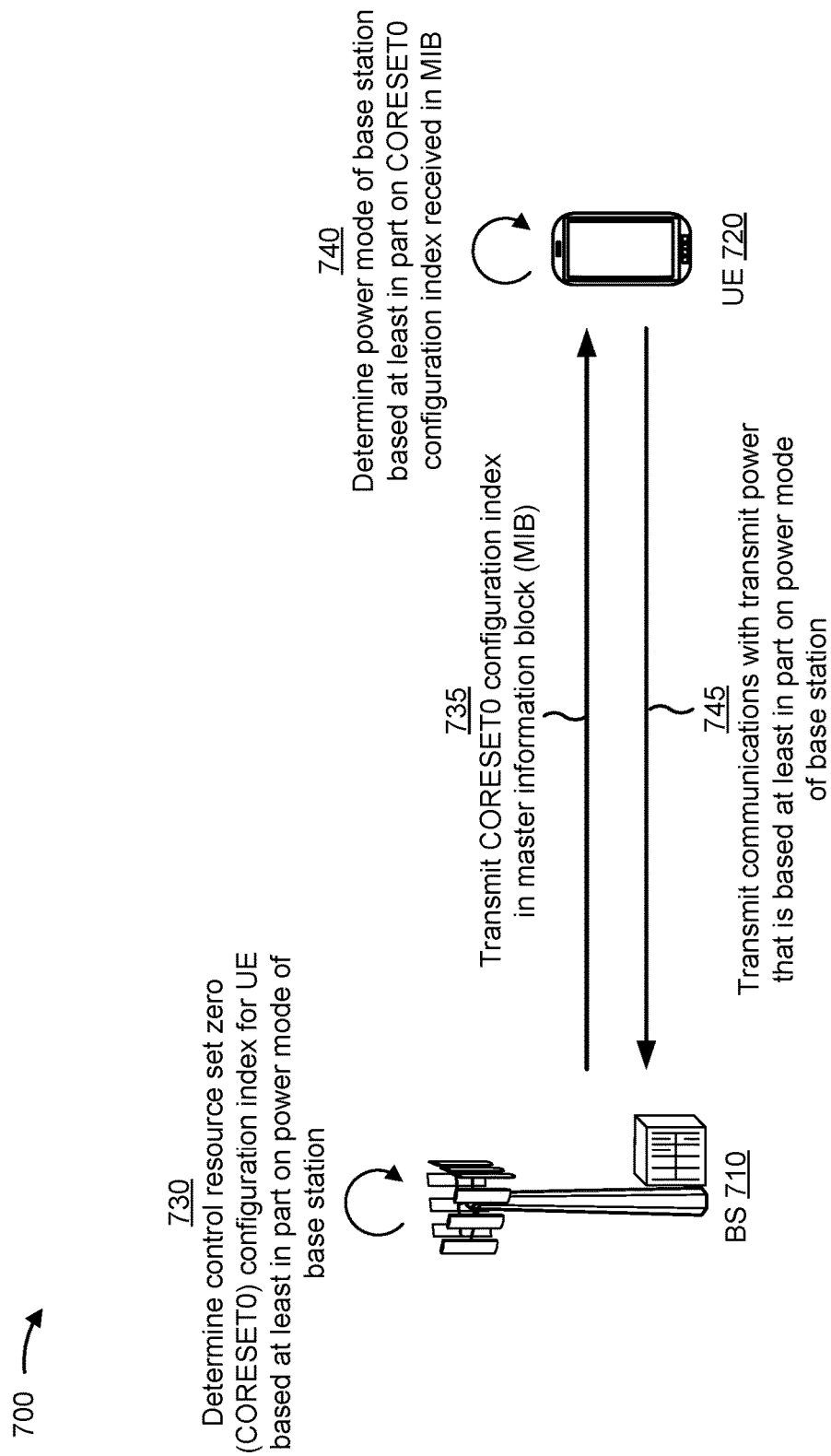
FIG. 7 is a diagram illustrating example of distinguishing power modes of a base station, in accordance with various aspects of the present disclosure.

FIG. 7 is a diagram illustrating example 700 of distinguishing power modes of a base station, in accordance with various aspects of the present disclosure. As shown in FIG. 7, example 700 includes communication between a base station (BS) 710 (e.g., a BS 110 depicted in FIGS. 1 and 2) and a UE 720 (e.g., a UE 120 depicted in FIGS. 1 and 2). In some aspects, BS 710 and UE 720 may be included in a wireless network, such as wireless network 100. BS 710 and UE 720 may communicate on a wireless access link, which may include an uplink and a downlink.

As shown by reference number 730, BS 710 may determine a CORESET configuration index (e.g., CORESET0 configuration index) for UE 720 based at least in part on a power mode of BS 710. BS 710 may select a CORESET0 configuration index from a first set of indices (e.g., 0-7) if BS 710 is in a standard power mode and select a CORESET0 configuration index from a second set of indices (e.g., 8-15) if BS 710 is in a low power mode. As shown by reference number 735, BS 710 may transmit the CORESET0 configuration index to UE 720. BS 710 may transmit the CORESET0 index in an MIB (e.g., in pdcch-ConfigSIB1).

UE 720 may determine a power mode of BS 710 based at least in part on the CORESET0 index, as shown by reference number 740. In some aspects, UE 720 may determine the power mode of BS 710 by determining an initial BWP from the CORESET0 index. A CORESET0 bandwidth may be equal to an initial BWP. For a standard power mode, the initial BWP may be 20 MHz. For a low power mode, the initial BWP may be up to 80 MHz, an SSB position may be closest to a boundary of the initial BWP, and a maximum aggregation level may be extended to 64 (e.g., 1, 2, 4, 8, 16, 32, 64).

As shown by reference number 745, UE 720 may transmit communications with a transmit power that is based at least in part on a power mode of BS 710. For example, if BS 710 is in a low power mode, UE 720 may have a reduced transmit power such that the transmit power of UE 720 remains at least 6 dBm below a transmit power of BS 710.

CORESET0 is used in the examples, but in some aspects, BS 710 may select and UE 720 may use other control information or a value from another control region.

As indicated above, FIG. 7 is provided as an example. Other examples may differ from what is described with regard to FIG. 7.

Figure 8:
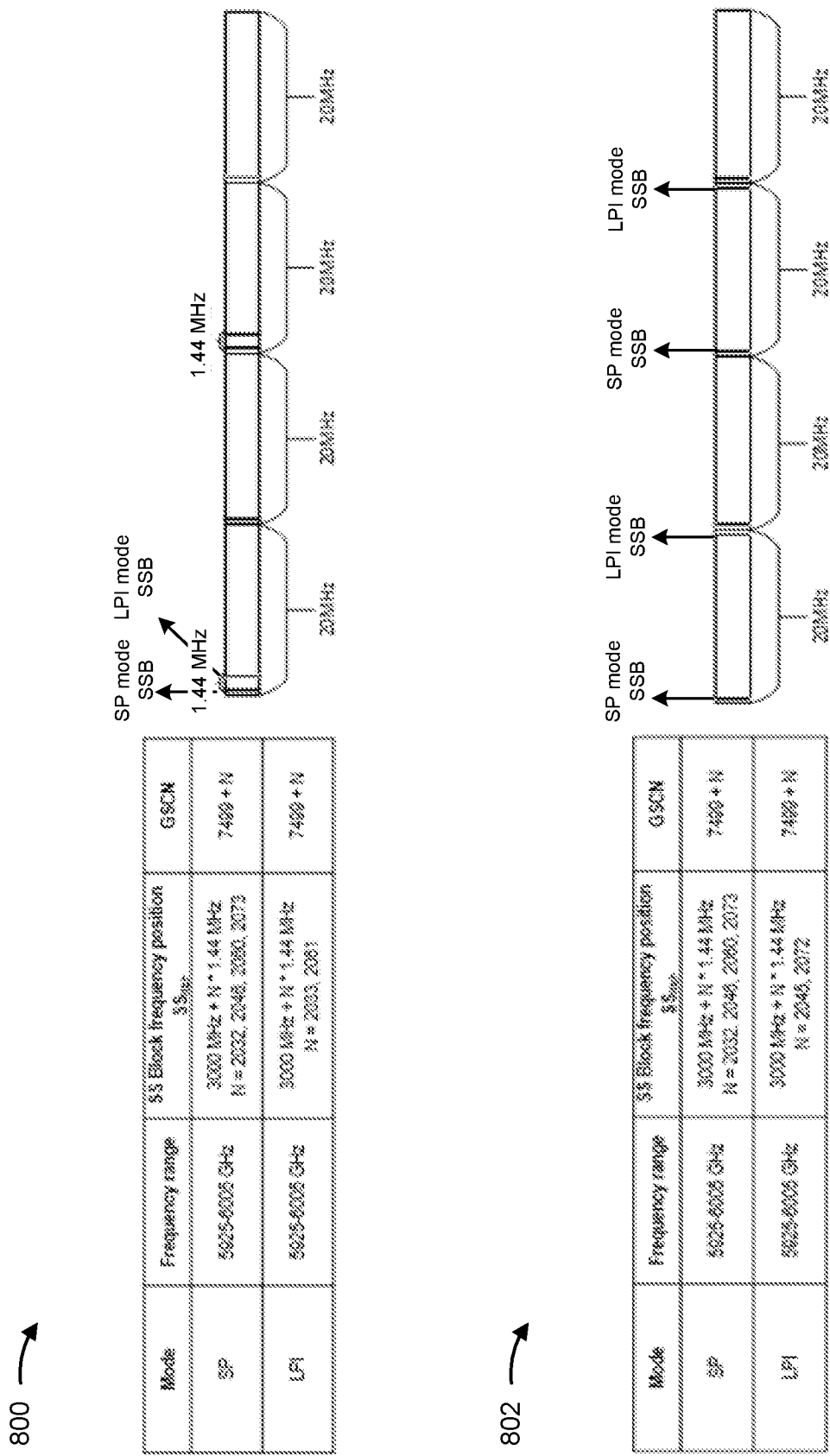
FIG. 8 is a diagram illustrating examples of distinguishing power modes of a base station, in accordance with various aspects of the present disclosure.

FIG. 8 is a diagram illustrating examples 800, 802 of distinguishing power modes of a base station, in accordance with various aspects of the present disclosure. Example 800 shows possible frequency positions for an SSB, for both a standard power mode (SP) and a low power indoor mode (LPI).

In some aspects, a base station may use a synchronization raster to indicate a power mode of the base station. For example, the base station may indicate the power mode of the base station via a frequency position of an SSB. The UE may derive the frequency position of the SSB using a raster formula and a GSCN. Both the UE and the base station may have a common understanding about one or more synchronizations raster formulas and a GSCN index. Example 800 shows an example of raster formulas for determining a frequency position of an SSB. The raster formula may be, for a standard mode, 3000 MHz+N*1.44 MHz. 3000 MHz may be a starting frequency. N may be a multiple or an index such as 2032, 2046, 2060, or 2073. N may be derived from the GSCN, where the GSCN is 7499 plus N.

If the SSB is in a frequency position that corresponds to this raster formula, the UE may determine that the base station is in a standard power mode. A frequency position for a standard power mode may be closest to a boundary of the bandwidth and repeat every 20 MHz.

The raster formula may be, for a low power mode, 3000 MHz+N*1.44 MHz, where N may be 2033 or 2061. A frequency position for a low power mode may be the frequency position for the standard power mode plus an offset by a raster offset frequency. FIG. 8 shows the raster offset frequency to be, for example, 1.44 MHz. A frequency position for the low power mode may be repeated every 40 MHz.

In some aspects, the UE may, for a 15 kilohertz (KHz) SCS, determine a CORESET0 start RB index from pdcch-ConfigSIB1 with an additional 8 RB offset. The UE may, for a 30 KHz SCS, determine a CORESET0 start RB index from pdcch-ConfigSIB1 with an additional 4 RB offset.

Example 802 shows frequency positions of an SSB for a standard power mode or a low power mode at two sides of a 20 MHz bandwidth. For a standard power mode, a frequency position for an SSB may be closest to a boundary of the 20 MHz bandwidth and repeat every 20 MHz. For a low power mode, a frequency position of an SSB may be at a top of a first 20 MHz and repeat every 40 MHz. N for a low power mode may be, for example, 2045 or 2072.

In some aspects, the UE may, for a 15 KHz SCS, determine a CORESET0 start RB index from pdcch-ConfigSIB1 with an additional 96 RB offset. The UE may, for a 30 KHz SCS, determine a CORESET0 start RB index from pdcch-ConfigSIB1 with an additional 48 RB offset.

As indicated above, FIG. 8 provides some examples. Other examples may differ from what is described with regard to FIG. 8

Figure 9:
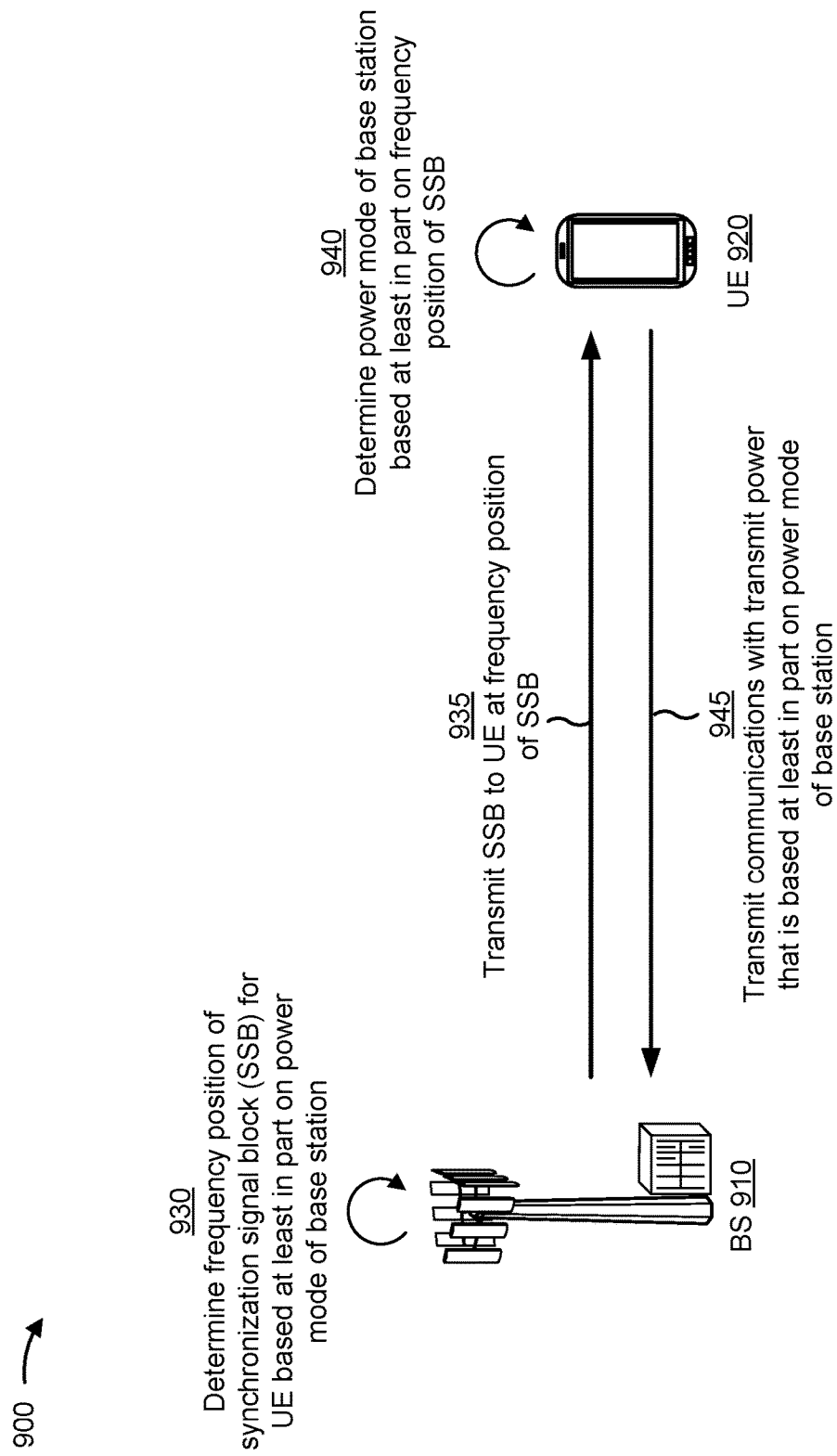
FIG. 9 is a diagram illustrating example of distinguishing power modes of a base station, in accordance with various aspects of the present disclosure.

FIG. 9 is a diagram illustrating example 900 of distinguishing power modes of a base station, in accordance with various aspects of the present disclosure. As shown in FIG. 9, example 900 includes communication between a base station (BS) 910 (e.g., a BS 110 depicted in FIGS. 1 and 2) and a UE 920 (e.g., a UE 120 depicted in FIGS. 1 and 2). In some aspects, BS 910 and UE 920 may be included in a wireless network, such as wireless network 100. BS 910 and UE 920 may communicate on a wireless access link, which may include an uplink and a downlink.

As shown by reference number 930, BS 910 may determine a frequency position of an SSB for UE 920. BS 910 may select the frequency position based at least in part on a power mode of BS 910. For example, if BS 910 is in a standard power mode, BS 910 may select an N index to use that places the frequency position of the SSB at a beginning of a 20 MHz bandwidth. If BS 910 is in a low power mode, BS 910 may place the frequency position of the SSB such that it is offset by 1.44 MHz. As shown by reference number 935, BS 910 may transmit an SSB to UE 920 at a frequency position that corresponds to candidate frequency positions for either a standard power mode or a low power mode.

As shown by reference number 940, UE 920 may determine a power mode of BS 910 based at least in part on a frequency position of an SSB. UE 920 may use a raster formula and a GSCN, such as described in connection with examples 800 and 802 in FIG. 8. As shown by reference number 945, UE 920 may transmit communications with a transmit power that is based at least in part on a power mode of BS 910. For example, UE 920 may transmit with a transmit power that is about 6 dBm less than a transmit power of BS 910. If BS 910 is operating in a low power mode, UE 920 may operate at a reduced transmit power mode. UE 920 may save power and avoid degrading communications by BS 910.

As indicated above, FIG. 9 is provided as an example. Other examples may differ from what is described with regard to FIG. 9.

Figure 10:
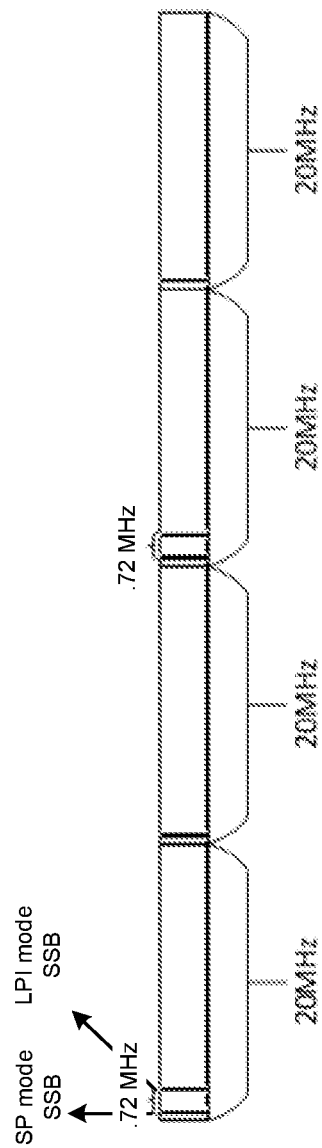
FIG. 10 is a diagram illustrating example of distinguishing power modes of a base station, in accordance with various aspects of the present disclosure.

FIG. 10 is a diagram illustrating example 1000 of distinguishing power modes of a base station, in accordance with various aspects of the present disclosure.

The UE may derive a frequency position of an SSB using a raster formula and a GSCN. Example 800 shows an example of raster formulas for determining a frequency position of an SSB. The raster formula may be, for a standard mode, 3000 MHz+N*1.44 MHz+M*0.72 MHz, where N is a multiple or an index that may be, for example, 2032, 2046, 2060, or 2073. N may be determined from a GSCN using a formula shown in example 1000 of FIG. 10. M is an additional fixed offset and may be 0 or 1-0 for a standard power mode and 1 for a low power mode. If the SSB is in such a frequency position, the UE may determine that the base station positioned the SSB in the frequency position to indicate to the UE that the base station is in a standard power mode. The raster formula may be, for a low power mode, 3000 MHz+N*1.44 MHz+M*0.72 MHz, where N may be 2032 or 2060. BS 910 and UE 920 may use known raster formulas (and a known GSCN) to determine a base station power mode from an SSB position. In other words, a base station may implicitly indicate a power mode of the base station through existing signaling and/or through new signaling.

As indicated above, FIG. 10 is provided as an example. Other examples may differ from what is described with regard to FIG. 10.

Figure 11:
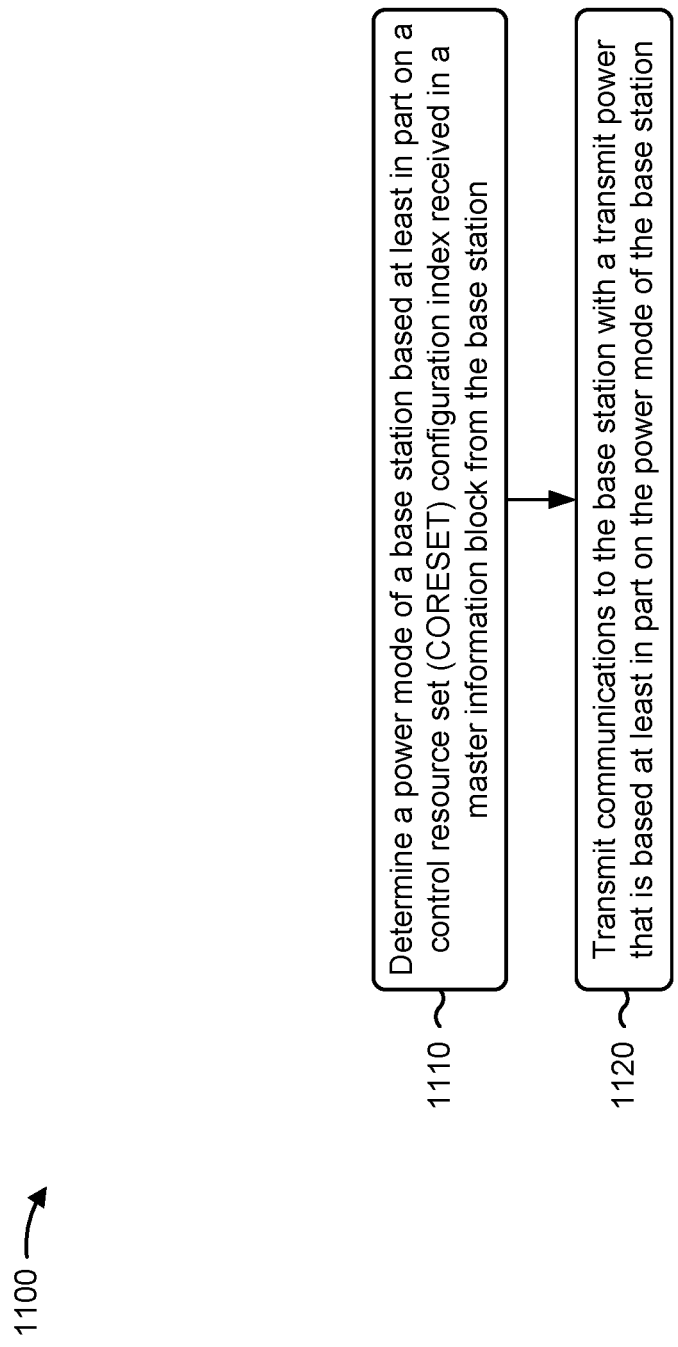
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where the UE (e.g., a UE 120 depicted in FIGS. 1 and 2, UE 720 depicted in FIG. 7, and/or the like) performs operations associated with distinguishing power modes of a base station.

As shown in FIG. 11, in some aspects, process 1100 may include determining a power mode of a base station based at least in part on a CORESET configuration index received in a master information block from the base station (block 1110). For example, the UE (e.g., using receive processor 258, transmit processor 264, controller/processor 280, memory 282, and/or the like) may determine a power mode of a base station based at least in part on a CORESET configuration index received in a master information block from the base station, as described above.

As further shown in FIG. 11, in some aspects, process 1100 may include transmitting communications to the base station with a transmit power that is based at least in part on the power mode of the base station (block 1120). For example, the UE (e.g., using receive processor 258, transmit processor 264, controller/processor 280, memory 282, and/or the like) may transmit communications to the base station with a transmit power that is based at least in part on the power mode of the base station, as described above.

Process 1100 may include additional aspects, such as any single aspect or any combination of aspects described below and/or in connection with one or more other processes described elsewhere herein.

In a first aspect, determining the power mode includes determining a BWP size for the UE based at least in part on the CORESET configuration index.

In a second aspect, alone or in combination with the first aspect, determining the power mode includes determining the power mode to be a standard power mode based at least in part on the CORESET configuration index being in a lower set of CORESET configuration indices.

In a third aspect, alone or in combination with one or more of the first and second aspects, the lower set of CORESET configuration indices includes indices 0 through 7.

In a fourth aspect, alone or in combination with one or more of the first through third aspects, determining the power mode includes determining the power mode to be a low power mode based at least in part on the CORESET configuration index being in an upper set of CORESET configuration indices.

In a fifth aspect, alone or in combination with one or more of the first through fourth aspects, the upper set of CORESET configuration indices includes indices 8 through 15.

In a sixth aspect, alone or in combination with one or more of the first through fifth aspects, transmitting communications with a transmit power that is based at least in part on the power mode of the base station includes reducing the transmit power of the UE based at least in part on the base station being in a low power mode.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
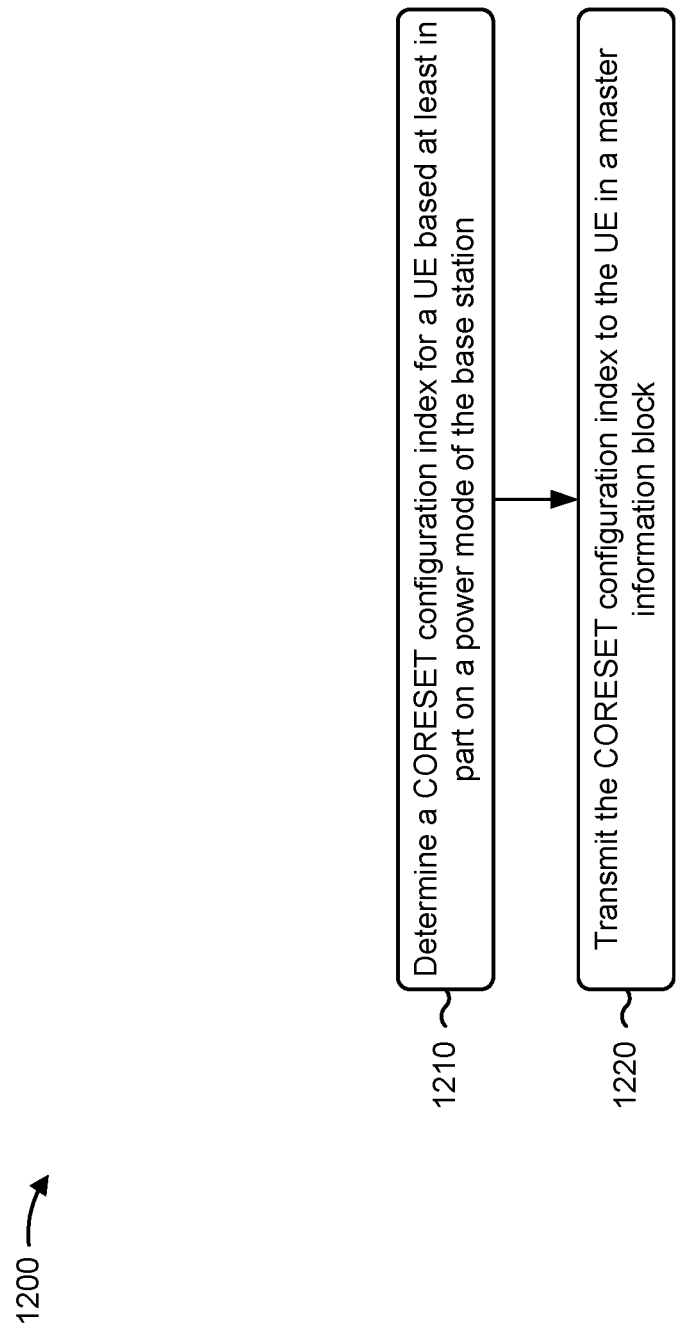
FIG. 12 is a diagram illustrating an example process performed, for example, by a base station, in accordance with various aspects of the present disclosure.

FIG. 12 is a diagram illustrating an example process 1200 performed, for example, by a base station, in accordance with various aspects of the present disclosure. Example process 1200 is an example where the base station (e.g., base station 110 depicted in FIGS. 1 and 2, BS 710 depicted in FIG. 7, and/or the like) performs operations associated with distinguishing power modes of a base station.

As shown in FIG. 12, in some aspects, process 1200 may include determining a CORESET configuration index for a UE based at least in part on a power mode of the base station (block 1210). For example, the base station (e.g., using transmit processor 220, receive processor 238, controller/processor 240, memory 242, and/or the like) may determine a CORESET configuration index for a UE based at least in part on a power mode of the base station, as described above. In some aspects, the CORESET configuration index may be a CORESET0 configuration index, a value in another control region, another index, another value in an information element, and/or the like.

As further shown in FIG. 12, in some aspects, process 1200 may include transmitting the CORESET configuration index to the UE in a master information block (block 1220). For example, the base station (e.g., using transmit processor 220, receive processor 238, controller/processor 240, memory 242, and/or the like) may transmit the CORESET configuration index to the UE in a master information block, as described above.

Process 1200 may include additional aspects, such as any single aspect or any combination of aspects described below and/or in connection with one or more other processes described elsewhere herein.

In a first aspect, the CORESET configuration index corresponds to a BWP size for the UE.

In a second aspect, alone or in combination with the first aspect, determining the CORESET configuration index includes selecting the CORESET configuration index from a lower set of CORESET configuration indices based at least in part on the base station being in a standard power mode.

In a third aspect, alone or in combination with one or more of the first and second aspects, the lower set of CORESET configuration indices includes indices 0 through 7.

In a fourth aspect, alone or in combination with one or more of the first through third aspects, determining the CORESET configuration index includes selecting the CORESET configuration index from an upper set of CORESET configuration indices based at least in part on the base station being in a low power mode.

In a fifth aspect, alone or in combination with one or more of the first through fourth aspects, the upper set of CORESET configuration indices includes indices 8 through 15.

In a sixth aspect, alone or in combination with one or more of the first through fifth aspects, process 1200 includes receiving communications from the UE at a reduced transmit power based at least in part on the power mode of the base station being in a low power mode.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
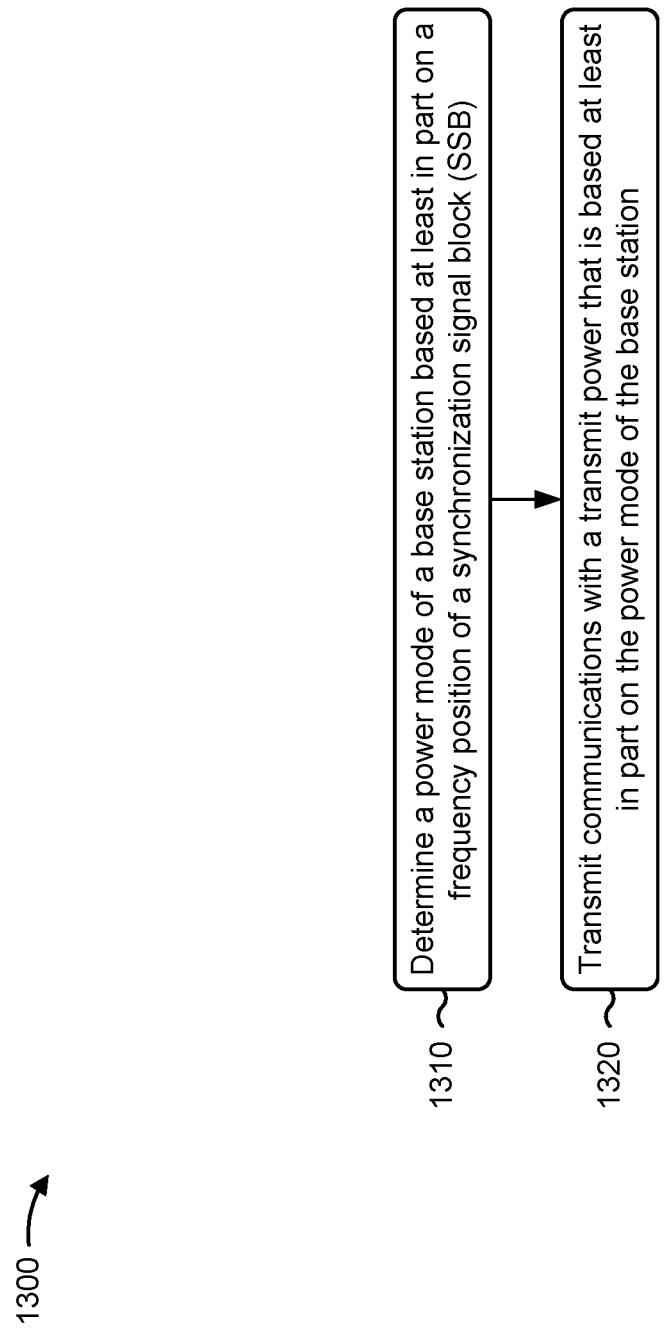
FIG. 13 is a diagram illustrating an example process performed, for example, by a UE, in accordance with various aspects of the present disclosure.

FIG. 13 is a diagram illustrating an example process 1300 performed, for example, by a UE, in accordance with various aspects of the present disclosure. Example process 1300 is an example where the UE (e.g., a UE 120 depicted in FIGS. 1 and 2, UE 920 depicted in FIG. 9. and/or the like) performs operations associated with distinguishing power modes of a base station.

As shown in FIG. 13, in some aspects, process 1300 may include determining a power mode of a base station based at least in part on a frequency position of an SSB (block 1310). For example, the UE (e.g., using receive processor 258, transmit processor 264, controller/processor 280, memory 282, and/or the like) may determine a power mode of a base station based at least in part on a frequency position of an SSB, as described above.

As further shown in FIG. 13, in some aspects, process 1300 may include transmitting communications with a transmit power that is based at least in part on the power mode of the base station (block 1320). For example, the UE (e.g., using receive processor 258, transmit processor 264, controller/processor 280, memory 282, and/or the like) may transmit communications with a transmit power that is based at least in part on the power mode of the base station, as described above.

Process 1300 may include additional aspects, such as any single aspect or any combination of aspects described below and/or in connection with one or more other processes described elsewhere herein.

In a first aspect, determining the power mode includes determining the frequency position of the SSB based at least in part on a GSCN.

In a second aspect, alone or in combination with the first aspect, determining the power mode of the base station includes determining the power mode to be a low power mode based at least in part on determining that a frequency position of the SSB corresponds to a calculation that is based at least in part on a starting frequency, an index derived from the GSCN, and a multiple of a raster offset frequency.

In a third aspect, alone or in combination with one or more of the first and second aspects, the frequency position of the SSB is one raster offset frequency after an SSB position that indicates a standard power mode for the base station, and the frequency position of the SSB for low power is 40 megahertz from another frequency position of the SSB for the low power mode.

In a fourth aspect, alone or in combination with one or more of the first through third aspects, the frequency position of the SSB is at an opposite end of a 20 megahertz bandwidth part from an SSB position that indicates a standard power mode for the base station, and the frequency position of the SSB for the low power mode is 40 megahertz from another frequency position of the SSB for the low power mode.

In a fifth aspect, alone or in combination with one or more of the first through fourth aspects, determining the power mode of the base station includes determining the power mode to be the low power mode based at least in part on determining that a frequency position of the SSB corresponds to a calculation that is based at least in part on a starting frequency, a multiple of a raster offset frequency, and a fixed offset.

In a sixth aspect, alone or in combination with one or more of the first through fifth aspects, process 1300 includes determining a starting RB based at least in part on a subcarrier spacing and an RB offset.

In a seventh aspect, alone or in combination with one or more of the first through sixth aspects, transmitting communications with a transmit power that is based at least in part on the power mode of the base station includes reducing the transmit power of the UE based at least in part on the base station being in a low power mode.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
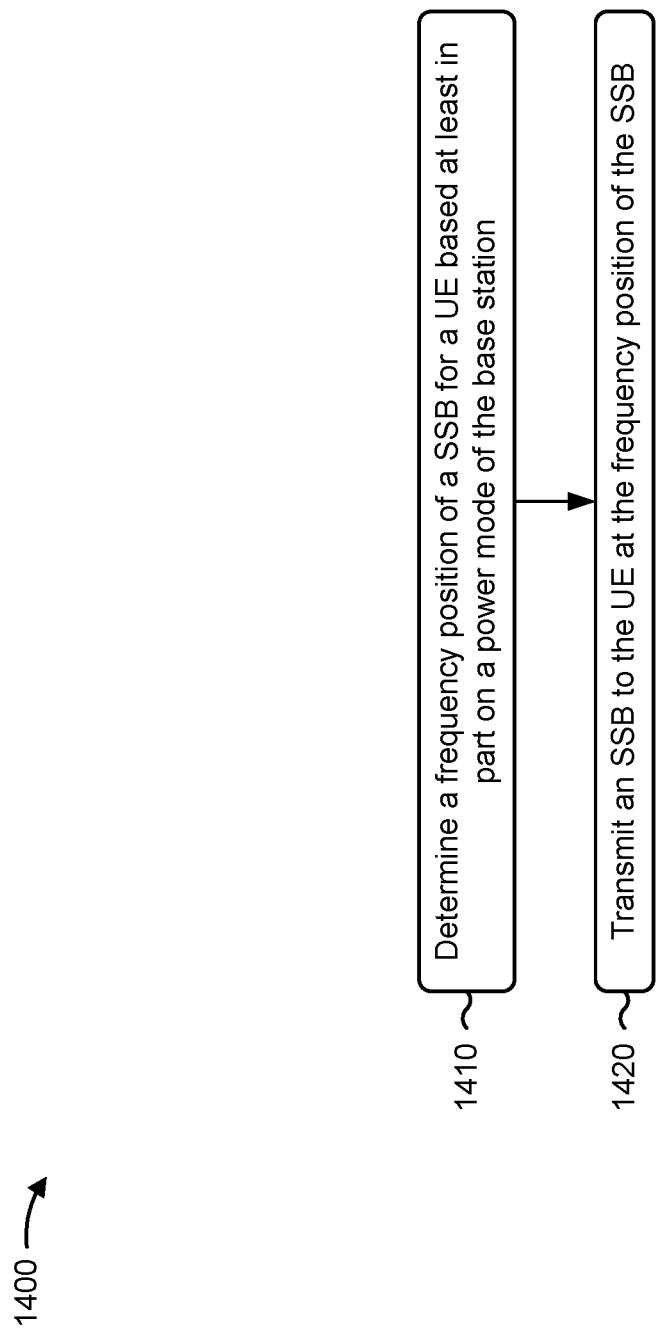
FIG. 14 is a diagram illustrating an example process performed, for example, by a base station, in accordance with various aspects of the present disclosure.

FIG. 14 is a diagram illustrating an example process 1400 performed, for example, by a base station, in accordance with various aspects of the present disclosure. Example process 1400 is an example where the base station (e.g., base station 110 depicted in FIGS. 1 and 2, BS 910 depicted in FIG. 9, and/or the like) performs operations associated with distinguishing power modes of a base station.

As shown in FIG. 14, in some aspects, process 1400 may include determining a frequency position of an SSB for a UE based at least in part on a power mode of the base station (block 1410). For example, the base station (e.g., using transmit processor 220, receive processor 238, controller/processor 240, memory 242, and/or the like) may determine a frequency position of an SSB for a UE based at least in part on a power mode of the base station, as described above.

As further shown in FIG. 14, in some aspects, process 1400 may include transmitting an SSB to the UE at the frequency position of the SSB (block 1420). For example, the base station (e.g., using transmit processor 220, receive processor 238, controller/processor 240, memory 242, and/or the like) may transmit an SSB to the UE at the frequency position of the SSB, as described above.

Process 1400 may include additional aspects, such as any single aspect or any combination of aspects described below and/or in connection with one or more other processes described elsewhere herein.

In a first aspect, process 1400 includes determining a GSCN based at least in part on the frequency position of the SSB.

In a second aspect, alone or in combination with the first aspect, the frequency position of the SSB corresponds to a calculation that is based at least in part on a starting frequency, an index derived from the GSCN, and a multiple of a raster offset frequency.

In a third aspect, alone or in combination with one or more of the first and second aspects, the frequency position of the SSB is one raster offset frequency after an SSB position that indicates a standard power mode for the base station, and the frequency position of the SSB for a low power mode is 40 megahertz from another frequency position of the SSB for the low power mode.

In a fourth aspect, alone or in combination with one or more of the first through third aspects, the frequency position of the SSB is at an opposite end of a 20 megahertz bandwidth part from an SSB position that indicates a standard power mode for the base station, and the frequency position of the SSB for a low power mode is 40 megahertz from another frequency position of the SSB for the low power mode.

In a fifth aspect, alone or in combination with one or more of the first through fourth aspects, the frequency position of the SSB corresponds to a calculation that is based at least in part on a starting frequency, a multiple of a raster offset frequency, and a fixed offset.

In a sixth aspect, alone or in combination with one or more of the first through fifth aspects, process 1400 includes determining a starting RB based at least in part on a subcarrier spacing and an RB offset.

In a seventh aspect, alone or in combination with one or more of the first through sixth aspects, process 1400 includes receiving communications from the UE at a reduced transmit power based at least in part on the power mode of the base station being in a low power mode.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining a power mode of a base station based at least in part on a control resource set (CORESET) configuration index received in a master information block from the base station; and
    transmitting communications to the base station with a transmit power that is based at least in part on the power mode of the base station.

2. A user equipment (UE) for wireless communication, comprising:
    a memory; and
    one or more processors coupled to the memory, the one or more processors configured to:
        determine a power mode of a base station based at least in part on a control resource set (CORESET) configuration index received in a master information block from the base station; and
        transmit communications to the base station with a transmit power that is based at least in part on the power mode of the base station.

3. The UE of claim 2, wherein the CORESET configuration index includes a CORESET0 configuration index.

4. The UE of claim 2, wherein the one or more processors, to determine the power mode, are configured to:
    determine a bandwidth part (BWP) size for the UE based at least in part on the CORESET configuration index; and
    determine the power mode based at least in part on the BWP size.

5. The UE of claim 2, wherein the one or more processors, to determine the power mode, are configured to determine the power mode to be a standard power mode based at least in part on the CORESET configuration index being in a lower set of CORESET configuration indices.

6. The UE of claim 5, wherein the lower set of CORESET configuration indices includes indices 0 through 7.

7. The UE of claim 2, wherein the one or more processors, to determine the power mode, are configured to determine the power mode to be a low power mode based at least in part on the CORESET configuration index being in an upper set of CORESET configuration indices.

8. The UE of claim 7, wherein the upper set of CORESET configuration indices includes indices 8 through 15.

9. The UE of claim 2, wherein the one or more processors, to transmit the communications, are configured to reduce the transmit power of the UE based at least in part on the base station being in a low power mode.

10. A base station for wireless communication, comprising:
a memory; and
one or more processors coupled to the memory, the one or more processors configured to:
determine a control resource set (CORESET) configuration index for a user equipment (UE) based at least in part on a power mode of the base station; and
transmit the CORESET configuration index to the UE in a master information block.

11. The base station of claim 10, wherein the CORESET configuration index includes a CORESET0 configuration index.

12. The base station of claim 10, wherein the CORESET configuration index corresponds to a bandwidth part (BWP) size for the UE.

13. The base station of claim 10, wherein the one or more processors, to determine the CORESET configuration index, are configured to select the CORESET configuration index from a lower set of CORESET configuration indices based at least in part on the base station being in a standard power mode.

14. The base station of claim 13, wherein the lower set of CORESET configuration indices includes indices 0 through 7.

15. The base station of claim 10, wherein the one or more processors, to determine the CORESET configuration index, are configured to select the CORESET configuration index from an upper set of CORESET configuration indices based at least in part on the base station being in a low power mode.

16. The base station of claim 15, wherein the upper set of CORESET configuration indices includes indices 8 through 15.

17. The base station of claim 10, wherein the one or more processors are configured to receive communications from the UE at a reduced transmit power based at least in part on the power mode of the base station being in a low power mode.

18. A user equipment (UE) for wireless communication, comprising:
a memory; and
one or more processors coupled to the memory, the one or more processors configured to:
determine a power mode of a base station based at least in part on a frequency position of a synchronization signal block (SSB); and
transmit communications with a transmit power that is based at least in part on the power mode of the base station.

19. The UE of claim 18, wherein the one or more processors, to determine the power mode, are configured to determine the frequency position of the SSB based at least in part on a global synchronization channel number (GSCN).

20. The UE of claim 19, wherein the one or more processors, to determine the power mode, are configured to determine the power mode to be a low power mode based at least in part on a determination that a frequency position of the SSB corresponds to a calculation that is based at least in part on a starting frequency, an index derived from the GSCN, and a multiple of a raster offset frequency.

21. The UE of claim 18, wherein the frequency position of the SSB is one raster offset frequency after an SSB position that indicates a standard power mode for the base station, and wherein the frequency position of the SSB for low power is 40 megahertz from another frequency position of the SSB for a low power mode.

22. The UE of claim 18, wherein the frequency position of the SSB is at an opposite end of a 20 megahertz bandwidth part from an SSB position that indicates a standard power mode for the base station, and wherein the frequency position of the SSB for a low power mode is 40 megahertz from another frequency position of the SSB for a low power mode.

23. The UE of claim 18, wherein the one or more processors, to determine the power mode, are configured to determine the power mode to be a low power mode based at least in part on a determination that a frequency position of the SSB corresponds to a calculation that is based at least in part on a starting frequency, a multiple of a raster offset frequency, and a fixed offset.

24. The UE of claim 18, wherein the one or more processors are configured to determine a starting resource block (RB) based at least in part on a subcarrier spacing and an RB offset.

25. The UE of claim 18, wherein the one or more processors, to transmit the communications, are configured to reduce the transmit power of the UE based at least in part on the base station being in a low power mode.

* * * * *